United States Patent
Bent et al.

(10) Patent No.: US 10,681,157 B2
(45) Date of Patent: Jun. 9, 2020

(54) ADAPTIVE EVENT MANAGEMENT FRAMEWORK FOR RESOURCE-CONSTRAINED ENVIRONMENTS

(71) Applicant: International Business Machines Corporation, Armonk, NY (US)

(72) Inventors: Oliver Bent, Kajiado (KE); Juliet K. Mutahi, Kajiado (KE); Bikram Sengupta, Karnataka (IN); Komminist S. Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 14/852,014

(22) Filed: Sep. 11, 2015

(65) Prior Publication Data

US 2017/0078169 A1     Mar. 16, 2017

(51) Int. Cl.
  *H04L 29/08*   (2006.01)
  *H04L 12/26*   (2006.01)

(52) U.S. Cl.
  CPC .............. *H04L 67/22* (2013.01); *H04L 43/02* (2013.01); *H04L 43/04* (2013.01); *H04L 43/06* (2013.01); *H04L 43/0817* (2013.01); *H04L 43/0876* (2013.01); *H04L 43/16* (2013.01); *H04L 67/2828* (2013.01); *H04L 67/2833* (2013.01)

(58) Field of Classification Search
  CPC . H04L 67/2828; H04L 67/04; H04L 67/1002; H04L 67/1008; H04L 67/1029; H04N 19/156; H04N 9/8042

USPC ................................................ 709/224, 247
See application file for complete search history.

(56) References Cited

U.S. PATENT DOCUMENTS

| 5,034,898 A | 7/1991 | Lu et al. |
| 5,960,436 A * | 9/1999 | Chang .................... G06F 9/466 |
| 6,138,156 A * | 10/2000 | Fletcher ................. H04L 12/14 |
| | | 709/217 |

(Continued)

OTHER PUBLICATIONS

Mutahi et al., Capturing Learner's Activity Events from a Mobile Learning System using Adaptive Event Framework, 2015 2nd ACM Int'l Conference on Mobile Software Eng'g and Sys., 109-12 (May 2015) (Year: 2015).*

(Continued)

*Primary Examiner* — David P Zarka
(74) *Attorney, Agent, or Firm* — Scully, Scott, Murphy & Presser, P.C.; Eyal Gilboa

(57) ABSTRACT

Intelligent management of user interface and device sensed events is provided. Discrete events generated through interactions between a user and a machine are monitored, the interaction performed via a user interface associated with an application running on the machine, the discrete events stored by sessions in a storage device local to the machine as event logs. Network connection pattern of the machine with a server device is determined. Storage constraints of the storage device are determined based on the monitoring and the network connection pattern. The event logs are compacted by progressively summarizing the discrete events on dynamically adjusted segments of the sessions. The compacted event logs are transmitted to the server device responsive to determining that a network connection between the machine and the server device is available.

20 Claims, 7 Drawing Sheets

(56) References Cited

U.S. PATENT DOCUMENTS

| | | | |
|---|---|---|---|
| 7,461,146 B2* | 12/2008 | Koning | H04L 29/06 709/213 |
| 7,694,309 B2 | 4/2010 | Cassorla | |
| 7,783,682 B1 | 8/2010 | Patterson | |
| 7,966,642 B2* | 6/2011 | Nair | G11B 20/1262 375/240.25 |
| 8,037,112 B2 | 10/2011 | Nath et al. | |
| 8,074,014 B2 | 12/2011 | Narayanan et al. | |
| 8,156,392 B2 | 4/2012 | Flynn et al. | |
| 8,826,287 B1 | 9/2014 | Graupner et al. | |
| 8,990,391 B2* | 3/2015 | Endrikhovski | G06F 3/04847 705/7.12 |
| 2002/0138559 A1* | 9/2002 | Ulrich | G06F 16/10 709/203 |
| 2008/0270628 A1* | 10/2008 | Nekovee | H04L 47/10 709/247 |
| 2009/0083228 A1* | 3/2009 | Shatz | G06K 9/00711 |
| 2011/0035215 A1* | 2/2011 | Sompolinsky | G10L 15/02 704/231 |
| 2011/0296015 A1 | 12/2011 | Chakravarty et al. | |
| 2014/0040042 A1 | 2/2014 | Schoen et al. | |
| 2014/0068018 A1 | 3/2014 | Roh et al. | |
| 2014/0208335 A1* | 7/2014 | Endrikhovski | G06F 3/04847 719/318 |
| 2017/0078169 A1* | 3/2017 | Bent | H04L 43/02 |

OTHER PUBLICATIONS

Mutahi et al., Seamless blended learning using the Cognitive Learning Companion: A systemic view, IBM J. of Res. and Dev., vol. 59, Issue 6, 8:1-8:13 (Nov. 2015) (Year: 2015).*

Samsung, http://developer.samsung.com/develop, printed on Aug. 6, 2015, 2 pages.

Google, "Google Analytics SDK v4 for Android—Getting Started", https://developers.google.com/analytics/devguides/collection/android/v4/#tracking-methods, printed on Aug. 6, 2015, 6 pages.

Fletcher, G., "Android SDK v3.3 Quick Start", , http://support.mobileapptracking.com/entries/23675247-Android-SDK-v3-2-4-Quick-Start, Apr. 26, 2013, 2 pages.

Fletcher, G., "iOS SDK v3.9.1 Quick Start", http://support.mobileapptracking.com/entries/23745301-iOS-SDK-v3-2-1-Quick-Start, May 10, 2013, 2 pages.

Nath, S. et al. "FlashDB: Dynamic Self-tuning Database for NAND Flash", Proceeding of the 6th international conference on Information processing in sensor networks, ACM, Apr. 25 to 27, 2007, 10 pages.

Vo, H.T., et al., "LogBase: A Scalable Log structured Database System in the Cloud", Proceedings of the VLDB Endowment Aug. 27-31, 2012, vol. 5, No. 10, pp. 1004-1015.

Harris, T., et al ., "Optimizing Memory Transactions", 2006 PLDI conference, Jun. 10-16, 2006, pp. 14-25, vol. 41, Issue 6.

Dean, J., et al., "The tail at scale", Communications of the ACM, Feb. 2013, vol. 56, No. 2, pp. 74-80.

"EMC : Patent Issued for Ordering of Event Records in an Electronic System for Forensic Analysis", Sep. 10, 2014, http://www.4-traders.com/EMC-CORPORATION-12445/news/EMC--Patent-Issued-for-Ordering-of-Event-Records-in-an-Electronic-System-for-Forensic-Analysis-19025763/, 3 PAGES.

Bagherzadeh, A.A., et al., "A Multi-Agent Architecture for Tracking User Interactions in Browser-based Games", Proceedings of the 2012 IEEE Fourth International Conference On Digital Game And Intelligent Toy Enhanced Learning (Digitel'12), IEEE Computer Society, Mar. 27-30, 2012, pp. 105-107.

* cited by examiner

ADAPTIVE EVENT MANAGEMENT FRAMEWORK FOR RESOURCE-CONSTRAINED ENVIRONMENTS

FIELD

The present application relates generally to computers and computer applications, and more particularly to an adaptive event management framework for resource-constrained environments.

BACKGROUND

Information technology provides initiatives for a 'smarter' world which is increasingly instrumented, interconnected and intelligent. Instrumented applications and middleware, for example, in an education domain, collect and process user-content interaction data. The availability and growing popularity of rich, multi-media learning content (e.g., videos, games, simulations) and sophisticated interfaces (e.g., smart phones, tablets) promote high interaction. A single user learning session can potentially generate thousands of interaction events of different types.

Such events are generally first stored locally (e.g., in a user device such as a phone or tablet) and then periodically sent over to a server where the data can be persisted and made available to consuming applications for analysis. For example, Cloudant™ provides application programming interface (API) support for disconnected use and server synchronization; this is leveraged within Student Activity Information (SAI) Hub™ and the mEduPAL™ application. Cloudant™, is a product from International Business Machines Corporation (IBM®) Armonk, N.Y.

Student Activity Information (SAI) Hub and mEduPAL refer to two assets developed in IBM® to support both the storage and collection of dynamic user interactions from a blended learning environment.

Existing solutions assume availability of connectivity to continuously capture and transmit data to back-end systems. In the case of resource-constraints, they terminate data collection or halt the system/device operation. Thus, in resource constrained environments, this approach can pose challenges because in such environments, intermittent or lack of network connectivity prevents data from being updated regularly to the server and limited storage capabilities on the device do not allow all of the data to be saved. Such situations are common in emerging markets. It is common now for learners to have access to tablets (e.g., procured by themselves or donated by government or other organizations), which may come with pre-loaded content or applications, or may be loaded at educational institutions. However learners may only have intermittent network or internet connectivity, and sometimes not have connectivity for extended periods of time.

As a result, as learning proceeds in resource-constrained scenarios, user interaction data will not be stored beyond a point. Instrumented applications will have to stop collecting new data, or will delete existing data. Such missing data can lead to valuable user and content insights to be lost.

BRIEF SUMMARY

A method and system for intelligently managing user interface and device sensed events may be provided. The method in one aspect may include monitoring discrete events generated through interactions between a user and a machine, the interactions performed via a user interface associated with an application running on the machine, the discrete events stored by sessions in a storage device local to the machine as event logs. The method may also include determining network connection pattern of the machine with a server device. The method may further include determining storage constraints of the storage device based on the monitoring and the network connection pattern. The method may also include compacting the event logs by progressively summarizing the discrete events on dynamically adjusted segments of the sessions. The method may further include transmitting the compacted event logs to the server device responsive to determining that a network connection between the machine and the server device is available.

A system for intelligently managing user interface and device sensed events, in one aspect, may comprise a processor coupled to a storage device. A usage and task tracker may be operable to execute on the processor and further operable to monitor discrete events generated through interactions between a user and a processor, the interactions performed via a user interface associated with an application running on the processor. The discrete events may be stored by sessions in the storage device local to the processor as event logs. The usage and task tracker may be further operable to estimate an amount of storage needed to store the discrete events. A resource manager may be operable to execute on the processor and further operable to determine remaining storage on the storage device and a network connection pattern of the processor with a server device. A sensing and estimation engine may be operable to execute on the processor and further operable to determine storage constraints of the storage device based on the amount of storage needed to store the discrete events, the remaining storage on the storage device, and the network connection pattern. The sensing and estimation engine may be further operable to initiate compacting of the event logs by progressively summarizing the discrete events on dynamically adjusted segments of the sessions. The processor may be operable to transmit the compacted event logs to the server device responsive to determining that a network connection between the processor and the server device is available.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
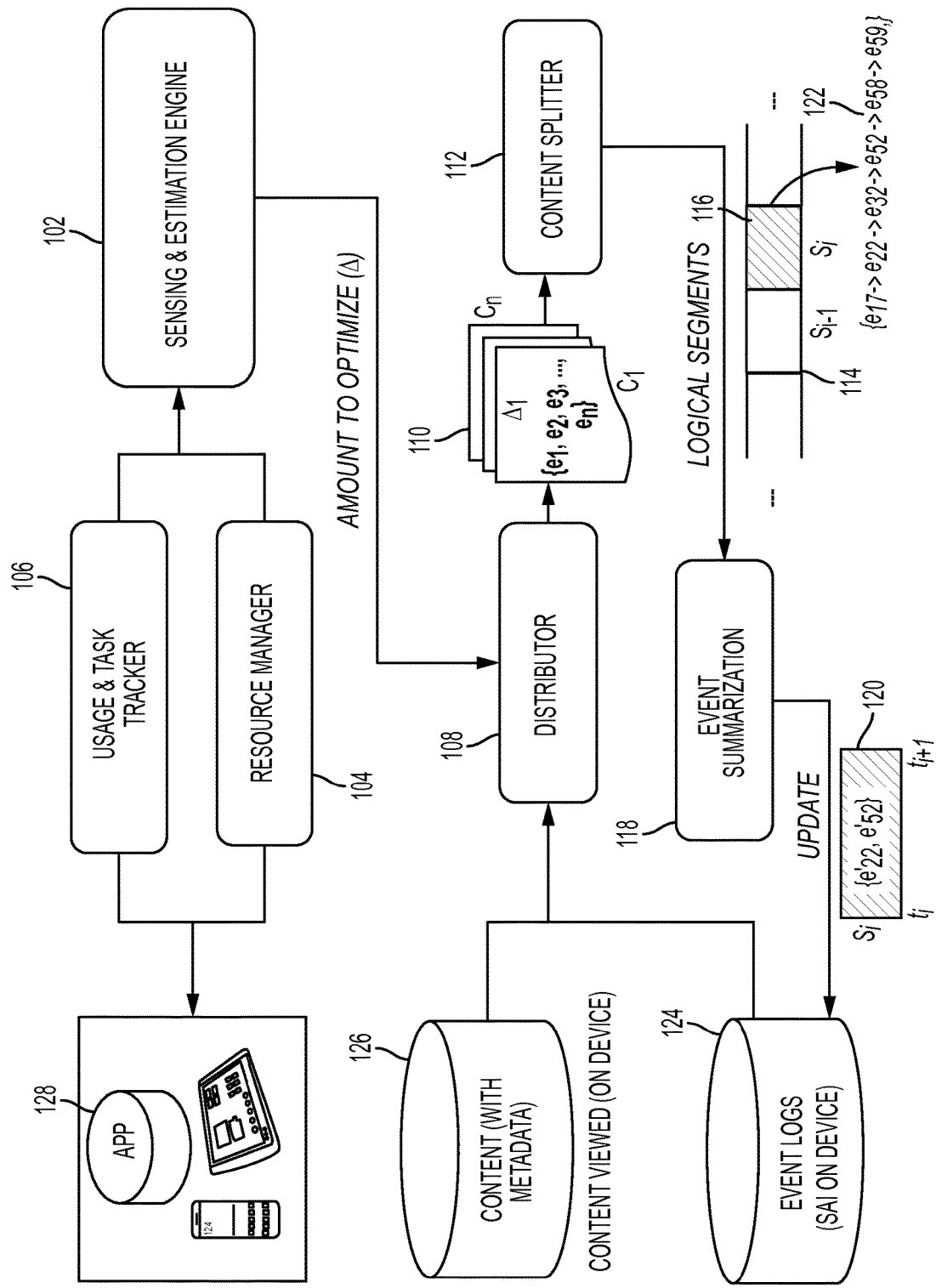
FIG. 1 is a component diagram illustrating a client side framework in one embodiment of the present disclosure.

Actions of user interaction with content presented on a computer device, such as start, pause, stop, fast forward, rewind, zoom-in, zoom-out, hover, expressed sentiments such as happy, sad, bored, may be all tagged with timestamp and/or location by instrumented applications and/or middleware. Such data can then be consumed by intelligent applications for adaptive and personalized learning to infer learner engagement, understanding and progress or lack thereof, for example, to infer content effectiveness and popularity, and for example, to infer learner sentiment, context and affective states.

An event management framework is provided in one embodiment that intelligently stores, manages and processes interaction data (e.g., learning interaction data) in resource-constrained environments. For instance, the interaction data are sensed event data. The management of sensed event data described in the present disclosure, in one embodiment may include progressive event summarization and similarity-based reconstruction from historical logs. For example, unlike existing techniques, which primarily employ event dropping leading to loss of valuable data and insights, the event management framework in one embodiment includes reconstructing events that may have been dropped, for example, because of resource constraints.

The event management framework in one embodiment includes client side and server side components. For instance, capturing summarizing of events may be performed at client side and reconstruction of event sequences using learning techniques may be done at server side.

The client side framework in one embodiment monitors resource levels, current event generation levels and estimates future event storage needs. Based on one or more of the resource levels, current event generation levels and estimated future event storage needs, the client side framework in one embodiment computes existing event data compaction needs. In one aspect, event data include fine-grained data. The client side framework in one embodiment also distributes event compaction needs over all the content that has been viewed, for which existing events logs exist. The client side framework in one embodiment logically partitions each content into segments (e.g., temporal or spatial) and applies multiple summarization techniques progressively on event data for select segments to meet compaction needs. In one aspect, progressive summarization controls information loss over individual segments. Segment size may be enlarged to gain more compaction. The client side framework in one embodiment sends an event log with summarizations to the server side framework, when network connection is established. In one aspect, the client side optimizes (reduces) the collected data without interrupting the normal execution of the client application/devices.

The server side framework in one embodiment clusters (or groups) users based on similarity. For example, users may be clustered based on similarity in viewing patterns of the same content, and other features such as demographics. In response to receiving, or the reception of, a compacted event log corresponding to a content object from a user device (e.g., the client side framework running on the user device), the server side framework retrieves event logs for the same object as viewed by similar users in the past. The server side framework in one embodiment segments each historic event log to align with the temporal and/or spatial segments of the received event log. For each aligned segment, the server side framework in one embodiment uses intelligent heuristics to reconstruct the received (summarized) event log (event sequence) based on analytics on the event logs of that segment from past similar users.

In one embodiment, the client and server side frameworks may also use domain rules to (respectively) drop events and re-insert them if needed. In one embodiment, this may be governed by the possible transition of events governed by the transition states of events in the viewing activity. In the case of viewing a video content the fact that there is a play event preceding a rewind event for example is implicit of the domain if subsequent events have been recorded for the particular viewing activity. In one embodiment, these domain rules are defined for the particular activity a user interacts with, in the above described example, watching a video content item.

While the present disclosure describes an education system scenario for explanation purposes, the methodology, system and/or technique embodied in the present disclosure can be generalized and adapted to other comparable domain implementations to handle problems with resource-constraints, for example, domains involving interaction events between entities organized into sessions.

FIG. 1 is a component diagram illustrating a client-side framework architecture in one embodiment of the present disclosure. The components shown in FIG. 1 are computer executable or readable components, that run on one or more processors or processing devices. A user may be running an app (or application) on a user device 128, e.g., mobile or smart phone, tablet, or another device. An example of an app is a learning or educational application that may include a user interface that allows the user to interact with the application, e.g., by gesture, touchscreen, and/or another input method, while viewing (or otherwise using) the content provided by the application. The actions or interactions of a user running the app on the user device 128 may be recorded as events. A Sensing and Estimation Engine 102 initiates an event summarization process by communicating with a Resource Manager 104 and a Usage and Task Tracker 106.

The Usage and Task Tracker 106 monitors the ongoing and planned activities on the client device 128 (a device which is running the client side framework) and estimates the amount of resources (storage) that would be needed to store the generated events. For example, there may be 2 videos left from the teacher assigned activities, of duration T1 and T2, and of size S1 and S2, on average E events generated kilobytes (KB) for similar content, therefore, it is likely that X KB event storage would be needed in time T.

The Resource Manager 104 keeps track of remaining storage, and network connectivity patterns to estimate when a connection may likely be available again. Examples of network connectivity patterns may include indications of number of connections in a period of time, e.g., connected 3 times in last 5 hours, no connection for past 8 hours, etc. The Resource Manager 104 aggregates the availability of resources based on the pending tasks and provides information for the Sensing and Estimation Engine 102. Based on this information, the Sensing and Estimation Engine 102 may initiate the event management process.

The Resource Manager 104 and the Usage and Task Tracker 106, respectively, provide resource-constraint level (such as connectivity, memory, processor, battery and other resource levels), along with broader contextual information (e.g., in classroom resource sharing between devices with free resources, through peer-to-peer (P2P)) and user interaction levels.

The Sensing and Estimation Engine 102 that communicates with the Usage and Task Tracker 106 and the Resource Manager 104 (or the like components) in one embodiment estimates the probability that the client device 128 will run of out of space in the next T time units, and initiates compaction responsive to detecting that the probability crosses a threshold, the compaction to be by an amount Δ that keeps the probability within that threshold.

A Distributor 108 distributes the amount to compact across content. For example, given a Δ value to be compacted and a set of event logs E collected for viewed content set C, the Distributor 108 may use a function to distribute Δ across each viewed content Ci 110 based on its metadata information. In one embodiment, content with few events (a given threshold number of events) may be excluded.

In one embodiment, this compaction is primarily performed on already generated event logs in order to allow for further event generation, once an entire activity has been performed by the user. In this way, the system and/or method described in the present disclosure may allow for a more complete optimization across the resource levels available to the client-side device. In one aspect, if it is determined that there are severe resource-constraints on storage, the system and/or method may satisfy the compaction requirements in real-time as events are generated.

Meta data information for a content item in this embodiment may include but is not limited to, the length of the item, e.g., in terms of time or pages (temporal/spatial lengths), the number of views of that item by the student and also by similar students, the segmentation of the content item into appropriate intervals as determined by user interactions, expected time to be spent on the content item, and others.

In one embodiment, the distributing function looks to create a uniform distribution of events across the segments of the content item. The distribution function determines discrete segment lengths that contain uniform distributions of events given the length of the content item and the frequency of events generated for that content item. This in one embodiment may be achieved through dynamic time warping (DTW) of the observed event sequence with a desired event distribution.

The set of event logs E collected for viewed content set C may be retrieved from one or more storage devices 124, 126 that stores the event logs and content with metadata. In one embodiment, compaction demand may be proportional to the size of the associated event log, based on importance of content.

For each content Ci 110, a Content Splitter 112 intelligently divides content Ci 110 into dynamic segments 114, as given by the result of dynamic time warping the content to a desired event distribution. Each generated viewing segment keeps track of all continuous events generated on a content viewed by a user. In one embodiment, a segment is defined by the temporal and/or spatial information of its boundaries, e.g., segment from 2nd to 3rd minute of video, or paragraphs 10 to 12 on page 5.

For any event whose span extends beyond a single segment, e.g., rewind from t1 to t2, the Content Splitter 112 in one embodiment may merge the event with either the preceding or following window based on relative similarity using a state machine. In another embodiment, Content Splitter 112 may place such event within the source segment, for example, t1 segment. Yet in another embodiment, Content Splitter 112 may place such event within the following segment, for example, t2 segment.

Given a dynamic segment $s_i$ 116, with event log E, an Event Summarizer 118 in one embodiment applies one of the following functions to progressively compact the event data. This process iterates until the requisite compaction is achieved.

Drop (e): This function drops an event e. An event is dropped only when domain rules allow it to be re-created later on the server side. For example, a fast forward (ffwd) or rewind (rwd) event will always return to previous state; thus, play-ffwd-play-pause can be compacted to play-ffwd-pause, and a domain rule can later insert a play prior to the pause.

ExcludeTS (E): This function removes the temporal and/or spatial values from the events such as the exact position in video and/or text, and the exact time when the event occurred, but otherwise preserves the events and the order information across the events. This function retains the temporal and/or spatial information about the segment boundaries. This function saves space by reducing the size of each event through loss of time-stamp information. Once this function is applied to content, which events in the content occurred in what order can still be identified, but not exact temporal and/or spatial positions of the events in the content.

Summarize (E): Summarize (E) summarizes or merges events based on their relationship, e.g., value, type and/or timestamp. For example, this function may only preserve the total number of each event type within a segment, e.g., 3 pause events, 1 increase-volume event, 2 zoom events. Once this function is applied to content, which events occurred can be identified, but not the exact positions, or the order.

In one embodiment, the functions of Exclude, Drop and Summarize are chosen based on the severity of the resource-constraint. The functions may be selected based on their ability to reach the required Δ for resource management with an understanding that the operations have different amounts of information loss associated with them, and with reconstruction requirements on the server-side.

An example of a compacted segment of content is shown at 120. For instance, an $s_i$ segment shown at 116 may include 6 events shown at 122. The segment $s_i$ is compacted to include 2 events as shown at 120. The compacted segments are stored in storage 124, e.g., a storage device that stores event logs.

The stored segmented and compacted events (e.g., in 124) are transmitted from the client device to a server side when a network connection is available.

Figure 2:
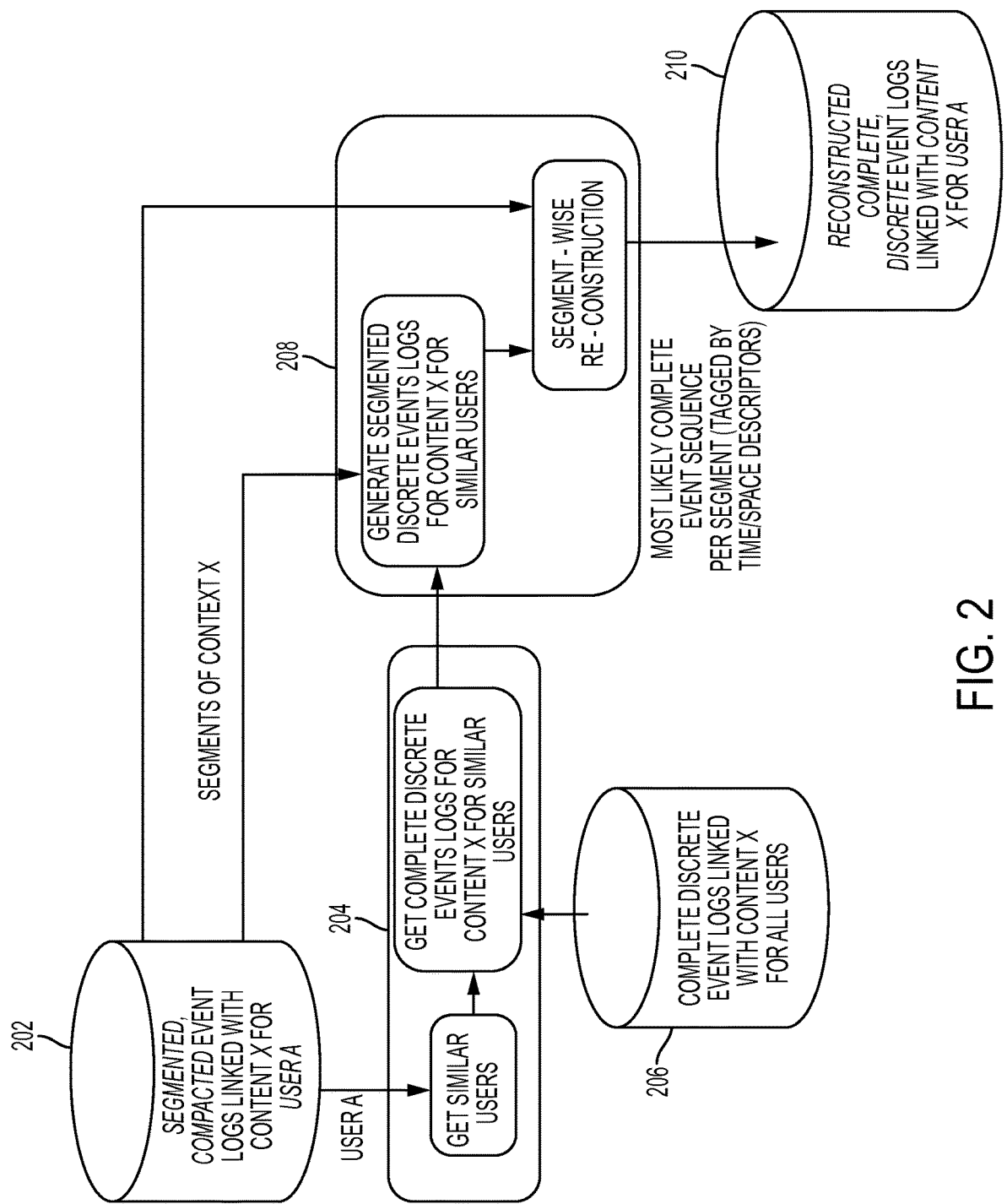
FIG. 2 is a diagram illustrating server framework architecture in one embodiment of the present disclosure.

FIG. 2 is a diagram illustrating server framework architecture in one embodiment of the present disclosure. The components shown in FIG. 2 are computer executable or readable components, that run on one or more processors or processing devices. A storage device 202 may store segmented compacted even logs linked with content X for user A, for example, for a plurality of content and a plurality of users, for example, in a database. A storage device 206 may store complete discrete event logs linked with content X for all users. The storage device 206 may store this information for a plurality of content. For instance, the segmented, compacted event logs 202 and the complete discrete event logs 206 are those generated in student activity information.

Given a user A, a component 204 of the server framework identifies similar users that are similar to the user A, by using past interactions with content, learning style derived from consumption patterns and other information such as demography and context associated with the user A and other users to build user similarity.

The component 204 of the server framework obtains complete discrete event logs for content X associated with those identified similar users from the storage device 206 that stores complete discrete event logs linked with context X for all user.

A component shown at 208, e.g., Reconstructor in one embodiment of the present disclosure takes as input: (i) segmented, compacted event logs for content X and user A 202; (ii) segmented, complete discrete event logs for content X and a set of users similar to A obtained at 204, where the segments in (ii) are aligned to those in (i). The component 208 in one embodiment generates segmented discrete event logs for content X for the identified similar users. The component 208 in one embodiment generates as output a re-constructed, complete, discrete event logs for content X and user A, where the re-constructed sequence represents the most likely time-stamped sequence of events, as generated when user A interacted with the content X. The reconstructed complete, discrete event logs linked with context X for user A may be stored in a storage device 210.

The component 208 may employ a set of heuristics for reconstructing the segmented, compacted event logs into complete discrete event logs. For instance, from the complete log files of similar users, the component 208 may extract subsequences of events that satisfy the constraints (which can be dynamically adjusted) defined in the reconstruction logic. For example, events that exceed a given length and frequency threshold may be extracted to form a subsequence. The component 208 may use combinatorial optimization techniques to generate an event sequence from the compacted event log that satisfies the maximum number of the extracted subsequences. The component 208 may add remaining events (i.e., events that are left by the event sequence generation technique) at appropriate positions in this sequence so that all relevant domain rules (e.g., as described above) are adhered to.

The component 208 may insert additional events (that might have been dropped at the client side leveraging domain rules) at appropriate positions in the sequence to obtain the full re-constructed sequence. In one embodiment, this insertion of events is governed through the same state transitions modeled for the dropping of events as described above. For example, if a play event has been dropped after a rewind event after a learner has viewed a learning content this can be reinserted on the server side as the server reestablishes the consistency of event sequences. In this case, in one embodiment, the consistency of event sequences is maintained through a modeled state transition (state machine), which determines that a rewind event must be followed by a play event if the content item has not been stopped after the rewind event.

For each event, the component 208 may determine a time and/or space stamp when it most likely occurred within the segment time window, e.g., by (i) dividing the segment into finer sub-segments; (ii) For each sub-segment, determining the average proportional distribution of events in the log files for similar users for this content; (iii) Proportionally distributing the events of this user across the sub-segments of this segment; (iv) Within each sub-segment, events may be distributed following a distribution function, e.g., equally spaced, random, or others.

Figure 3:
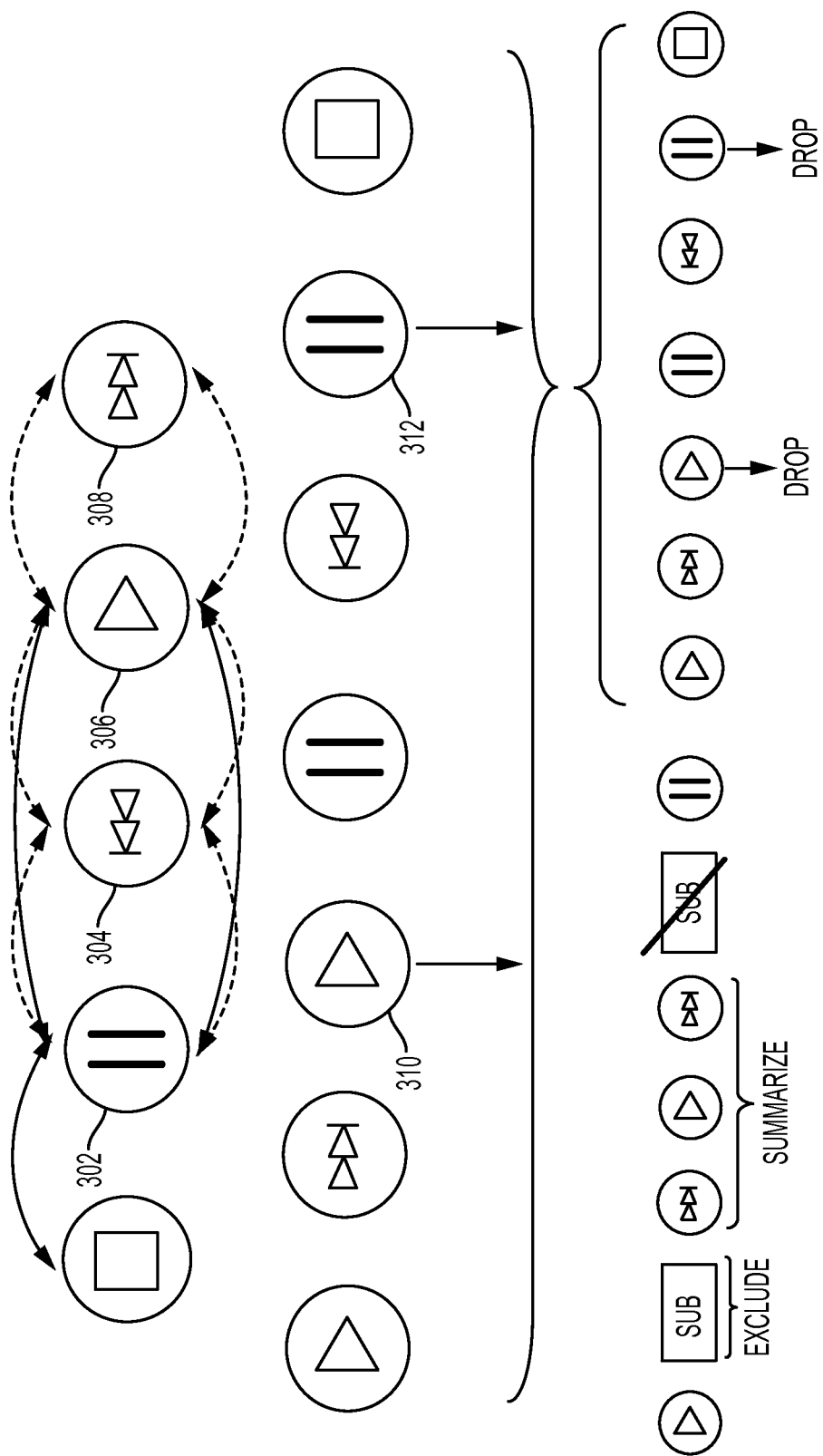
FIG. 3 shows an example state machine and a logic implemented for event dropping in the case of content viewing in one embodiment of the present disclosure.

FIG. 3 shows an example state machine for content used in dropping logic in one embodiment of the present disclosure. The dropping logic, e.g., is employed by the Event Summarizer (FIG. 1, 118) of the client-side of the framework in summarizing an event log. In one embodiment, the Drop (e) logic is based on two logic: state machine and relevance metrics based on analytics. In one embodiment, a reference state machine is generated that encodes permissible behaviors of interactions sequences of a user. The states represent event names and transitions between two states encode events. Each node represents an event. The example shown in FIG. 3 illustrates a state machine for a video content. Transitions (events) in the state machine shown with different arrows (solid, dashed) are "cyclic." This means that fast-forward 308 and rewind 304 will always return to previous state, i.e., play 306 and/or pause 302. Based on this information, events e3 (310) and e6 (312) are dropped in this example.

FIG. 3 also shows an example of the Exclude and Summarize operations. In this example, the fact that subtitles have been removed from the video implies that subtitles had been previously added. So the subtitles added event may be Excluded under resource-constraints. While the additional example of Summarization may be applied to the sequence of fast-forward, play, fast-forward events in the case that the user did not reach their chosen point in the content initially. This sequence may be Summarized by a single fast-forward event.

The present disclosure may provide a system and method that intelligently manages sensed events, for example, in a resource-constrained environment. Events are generated through interactions between entities and stored by sessions. A client component senses upcoming storage constraints and estimates compaction requirements. Event logs from past sessions are then compacted, based on progressive summarization actions performed on dynamically adjusted segments of the session. The compacted logs are transferred to a server component, for example, when network connectivity such as internet connectivity is available. The server component identifies historical sessions with a similar context and retrieves complete event logs from those sessions. In one embodiment, similar historical sessions may be identified by probabilistic algorithms that find the most likely event sequence and by a state machine that computes probability metrics for transitions. Such models may include but are not limited to Hidden Markov models (HMMs). In this embodiment, the summarized event sequences from the client devices describe the true (hidden) event sequence to be reconstructed on the server side implementation. The compacted event logs are also elaborated and reconstructed into completely sequenced and spatio and/or temporally tagged event logs based on additional patterns identified from the historical event logs.

Figure 4:
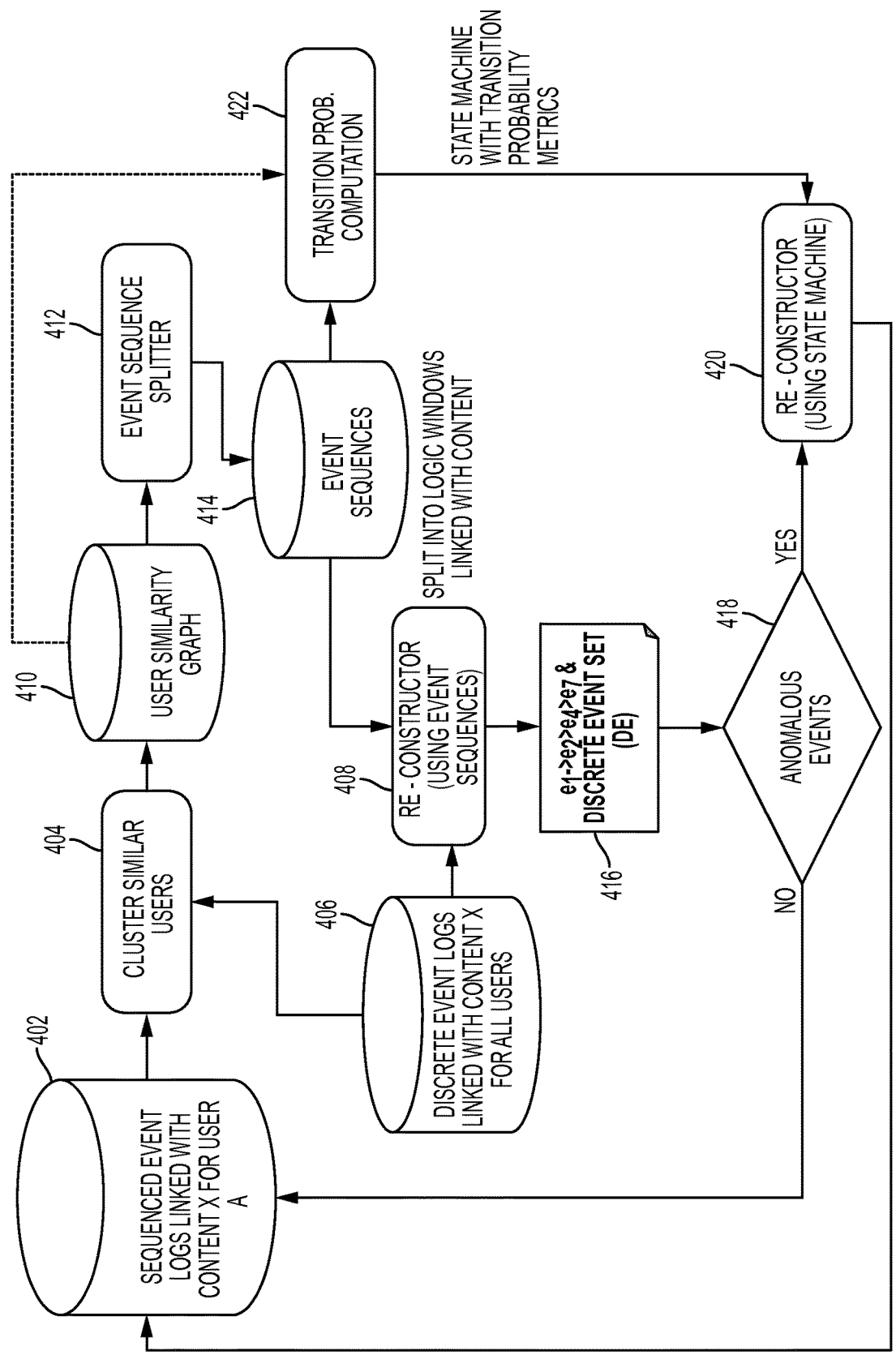
FIG. 4 illustrates server framework architecture in another aspect.

FIG. 4 illustrates another aspect of server framework architecture in one embodiment of the present disclosure. The components shown in FIG. 4 are computer executable or readable components, that run on one or more processors or processing devices. The server side framework, e.g., may store the segmented and compacted event logs linked with content X for user A received from the client side of the framework, in a storage device 402. The storage device 402 thus stores such data for a plurality of content and a plurality of users, for example, in a database. The server side framework may store complete discrete event logs linked with content X for all users in a storage device at 406. The storage device 406 may store this information for a plurality of content. Example of the segmented, compacted event logs 402 and the complete discrete event logs 406 are those generated in student activity information, for example, by students interacting with learning or educational computer applications/devices.

Given a user A, a clustering component 404 of the server framework identifies similar users that are similar to the user A, by using past interactions with content, learning style derived from consumption patterns and other information such as demography and context associated with the user A and other users to build a graph of user similarity and stores the similarity graph in a storage device 410. Similarity may be computed through an appropriate distance metric of nodes (users) on the graph, for example, identified through clustering algorithms such as K-means clustering.

The clustering component 404 obtains complete discrete event logs for content X associated with those identified similar users from the storage device 406 that stores complete discrete event logs linked with context X for all user.

An Event Sequence Splitter 412 splits the content of the similar users into logical windows of event sequences and stores the split logical windows linked with content in a storage device 414 for further analysis.

A Reconstructor at 408 in one embodiment of the present reconstructs the compacted segmented event log 402 for user A received from a client-side of the framework, into an uncompacted event log 416 using event sequence associated with the similar users 414. The Reconstructor 408 in one embodiment performs the functions described with reference to the component at 208 in FIG. 2.

The server side framework at 418 may determine whether there is an anomalous event in the reconstructed event log 416. If not, the event log may be stored in a storage device at 402.

If there is an anomalous event, the Reconstructor at 420 (this may be the same instance of the Reconstructor at 408) in one embodiment reconstructs the compacted segmented event log 402 for user A received from a client-side of the framework, into its original uncompacted event log using a state machine. For instance, transition probability computation component 422 using a state machine computes transition probability metrics. The Reconstructor 420 receives the transition probability metrics and based on the transition probability metrics, reconstructs the event log. The reconstructed event log may be stored in a storage device at 402.

Figure 5:
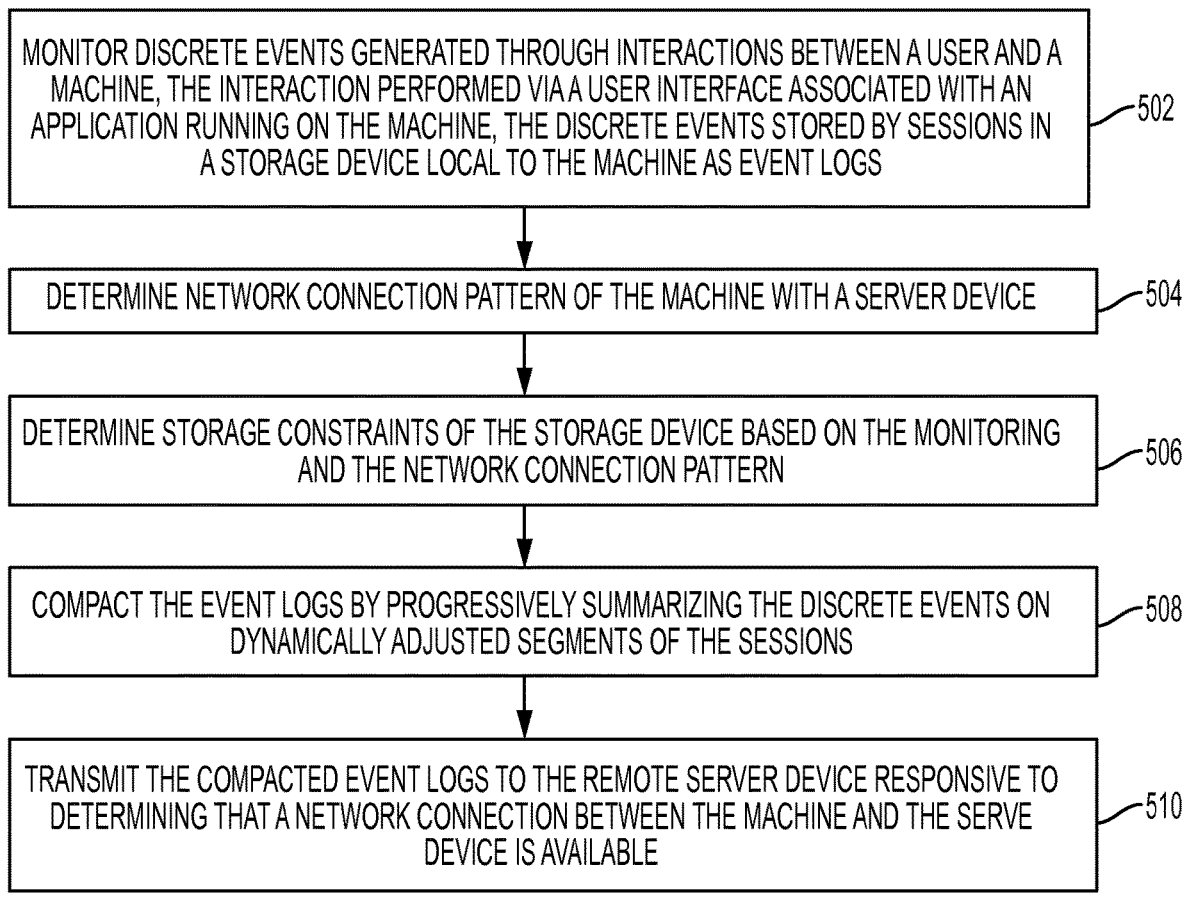
FIG. 5 is a flow diagram illustrating a method flow of a client-side event management framework in one embodiment of the present disclosure.

FIG. 5 is a flow diagram illustrating a method flow of a client-side of the event management framework in one embodiment of the present disclosure, for example, also described above with reference to FIG. 1. The method, for example, intelligently manages events sensed by a user interface (UI) and/or device, for example, application UI level events such as portable document format (pdf), audio and video application level events, feedback, communication events, and events sensed by sensors such as accelerometer, global positioning system (GPS) receiver, face detection, camera, and other sensors.

At 502, discrete events generated through interactions between a user and a machine, are monitored. Examples of the machine include, but are not limited to, a smart phone, tablet, laptop, other mobile devices, desktop. The interactions, for example, are performed via a user interface associated with an application running on the machine. The discrete events, for example, are stored by sessions in a storage device local to the machine as event logs. The discrete events may represent user actions performed on the machine during the interaction. The application may be an educational or learning application.

At 504, one or more patterns of a network connection between the machine and a server device are determined. At 506, storage constraints of the storage device are determined based on the monitoring and the network connection pattern. The determining of storage constraints, in one aspect, includes determining a probability that the machine will run of out of storage space in a defined time period (e.g., in the next T unit of time) and determining that the probability exceeds a first threshold.

At 508, the event logs are compacted by progressively summarizing the discrete events on dynamically adjusted segments of the sessions. The compacting, in one aspect, may further include compacting by a delta amount that keeps the probability within the first threshold. The event logs, in one aspect, may be compacted by dividing a session and associated event log into segments based on time and space. Within one or more of the segments, an action may be performed to drop an event that can be inserted back into an event sequence based on domain rules. Within one or more of the segments, an action may be performed to reduce a size of an event by removing time and space information associated with the event, except at the segment boundaries. Within one or more segments, an action may be performed to reduce the size of a segment log by only maintaining a number of events of different types that occur within the one or more segments. Any one or more combinations of the above actions or all of the actions may be performed for compacting the event logs.

At 510, the compacted event logs are transmitted to the server device responsive to determining that a network connection between the machine and the server device is available.

Figure 6:
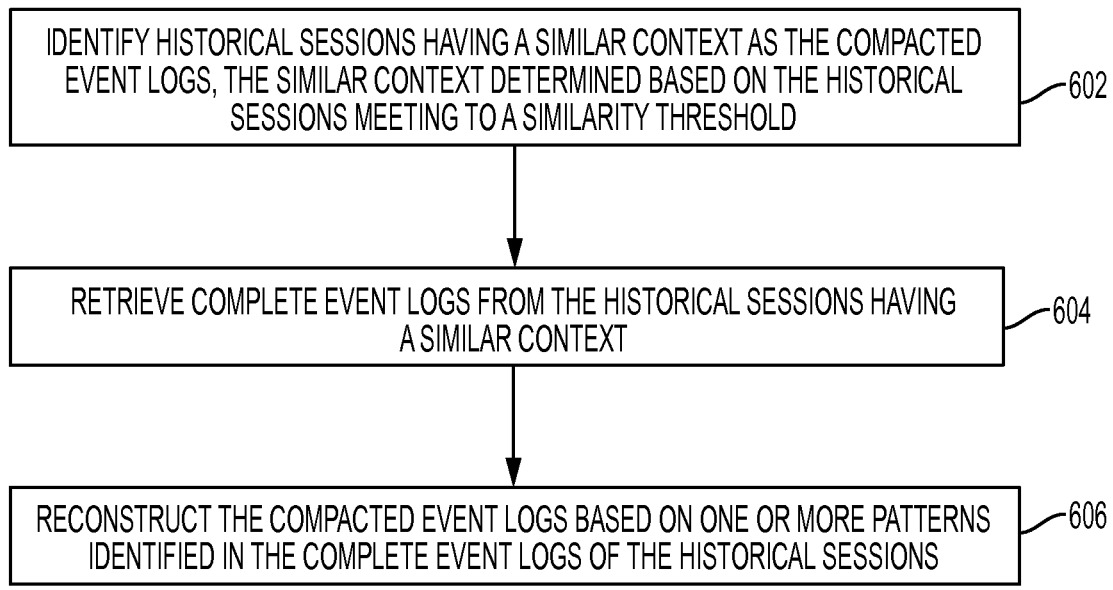
FIG. 6 is a flow diagram illustrating a method flow of a server-side event management framework in one embodiment of the present disclosure.

FIG. 6 is a flow diagram illustrating a method flow of a server-side of the event management framework in one embodiment of the present disclosure. At 602, historical sessions having a similar context as the compacted event logs are identified. Whether the context is similar may be determined based on the historical sessions meeting a similarity threshold.

At 604, complete event logs are retrieved from the historical sessions having the similar context as the compacted event logs. At 606, the compacted event logs are reconstructed based on one or more patterns identified in the complete event logs of the historical sessions.

The present disclosure may also provide a method or technique of compaction. Such technique in one embodiment may include dividing a session and associated event log into segments based on time and/or space. Within each segment, an action may be performed to drop events that can be inserted back into the sequence based on domain rules. Within each segment, an action may be performed to reduce the size of each event by dropping time and/or space information, except at the segment boundaries. Within each segment, an action may be performed to further reduce the size of a segment log by only maintaining the number of events of different types that occur within the segment.

Yet in another aspect, an event management framework may instrument events without effecting the learning experience, for example, by determining and estimating resource-constraint level ahead of time, distributing the resource required to be freed across the viewed content on the device, and chunking content into dynamic logical segments and determining the segments with high resource to summarize, exclude or drop events.

Yet in another aspect, an event management framework may reconstruct event sequences, for example, by constructing user similarity graph based on past interactions or engagement patterns, learning style, demography, context similarity, and/or other information, for reconstructing event sequences. The event management framework may leverage probabilistic algorithms (e.g., Hidden Markov Chain) to find the most likely event sequence in a given viewed segment of content. The event management framework may apply heuristics encoded in state machines transitions to model permissible state transitions, providing further input on how discrete events can be effectively sequenced.

An event management framework may determine how an event could have statistical effects on the type of analysis to be performed, for event dropping, exclusion, summarization and reconstructions. In particular, based on the type of event and the relationship between past historical evidence on collected events and analysis performed, the framework may apply statistical analysis technique to determine the effect of an event when applying the compaction operations on it.

The event management framework of the present disclosure in one embodiment may be integrated or work with an educational or learning application system. Globally, education transformation continues to have challenges, especially in many developing countries, for example, due to shortage of trained teachers, inadequate infrastructure and non-personalized learning in overcrowded classrooms, and highly variable and volatile socio-economic constraints affecting learners' contextual situation. At the same time, the education industry is witnessing rapid adoption of digital learning content in personal devices such as tablets, which allows for anytime, anywhere learning. Applications that provide digital learning content allows for interactive learning and social testing platforms that enable learners to take curriculum-centered content and assessments on their mobile and/or tablet devices. Such applications enable students to reach their potential through increased access to educational resources that extend learning beyond the capacities or limitations of their school or community, and stimulate and personalize the learning and teaching experience within and outside of school settings. Analytics models are used to generate the right insights at the right time to inform and enhance all interventions and/or actions in a personalized manner and to empower educators. A large corpus of data is an important part of an analytics algorithm, relevant to discovering engagement of a user with the learning content, predicting performance and personalizing learning paths. The event management framework of the present disclosure can work in resource-constrained environments, for example, characterized by dynamic context, limited computing resources, intermittent network connectivity. The event management framework of the present disclosure in one embodiment captures fine-grained user interactions with the content and devices and responds to it appropriately based on the context. Events generated via these interactions are referred to as Student Activity Information (SAI).

Figure 7:
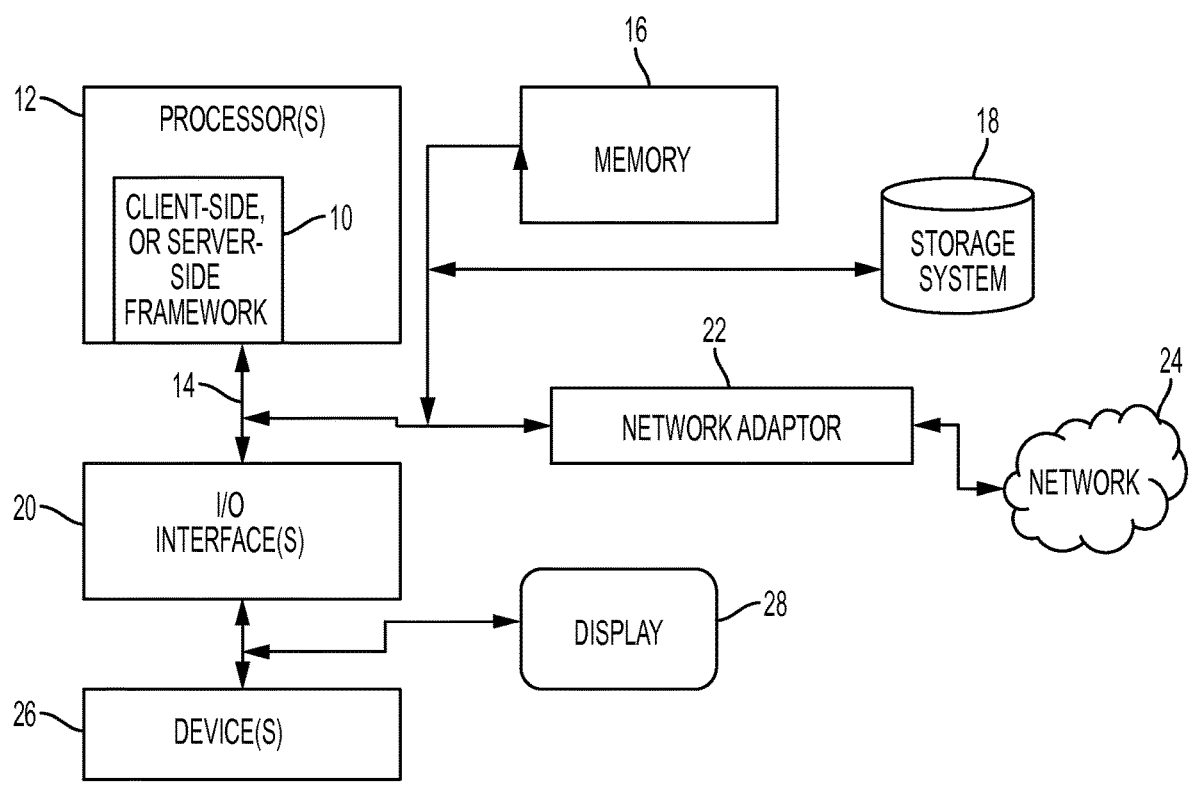
FIG. 7 illustrates a schematic of an example computer or processing system that may implement a client-side framework or a server-side framework in one embodiment of the present disclosure.

FIG. 7 illustrates a schematic of an example computer or processing system that may implement a client-side framework or a server-side framework in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 (e.g., client-side functionality or a server-side functionality) that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for intelligently managing user interface and device sensed events, comprising:
monitoring events generated through interactions between a user and a processor, the interactions performed via a user interface associated with an application running on the processor, the events stored by sessions in the storage device local to the processor as event logs;
estimating an amount of storage needed to store the events;
determining remaining storage on the storage device and a network connection pattern of the processor with a server device;
determining storage constraints of the storage device based on the amount of storage needed to store the events, the remaining storage on the storage device, and the network connection pattern;
initiating compacting of the event logs by progressively summarizing the events on dynamically adjusted segments of the sessions, wherein the segments are determined based on segmenting content item of the interaction into intervals and dynamically adjusted based on dynamic time warping of observed event sequence in the interaction with a desired event distribution, wherein a uniform distribution of events across the segments is created by determining discrete segment lengths that contain uniform distributions of events given a length of the content item and a frequency of events generated for the content item;
performing, within one or more of the segments, an action to drop an event according to a domain rule, which event the domain rule allows it to be recreated and inserted back into an event sequence; and
transmitting the compacted event logs to the server device responsive to determining that a network connection between the processor and the server device is available.

2. The method of claim 1, wherein the determining storage constraints comprises determining a probability that the machine will run of out of storage space in a defined time period and determining that the probability exceeds a first threshold.

3. The method of claim 2, wherein the compacting further comprises compacting by a delta amount that keeps the probability within the first threshold.

4. The method of claim 1, wherein the compacting the event logs comprises at least one of:
dividing a session and associated event log into segments based on time and space;
within one or more of the segments, performing an action to reduce a size of an event by removing time and space information associated with the event, except at the segment boundaries; and
within one or more segments, performing an action to reduce the size of a segment log by only maintaining a number of events of different types that occur within the one or more segments.

5. The method of claim 1, wherein the discrete events represent actions performed on the machine during the interaction.

6. The method of claim 1, wherein the application comprises educational application.

7. A system for intelligently managing user interface and device sensed events, comprising:
a processor coupled to a storage device;
a usage and task tracker operable to execute on the processor and further operable to monitor events generated through interactions between a user and a processor, the interactions performed via a user interface associated with an application running on the processor, the events stored by sessions in the storage device local to the processor as event logs, the usage and task tracker further operable to estimate an amount of storage needed to store the events;
a resource manager operable to execute on the processor and further operable to determine remaining storage on the storage device and a network connection pattern of the processor with a server device; and
a sensing and estimation engine operable to execute on the processor and further operable to determine storage constraints of the storage device based on the amount of storage needed to store the events, the remaining storage on the storage device, and the network connection pattern, the sensing and estimation engine further operable to initiate compacting of the event logs by progressively summarizing the events on dynamically adjusted segments of the sessions, wherein the segments are determined based on segmenting content item of the interaction into intervals and dynamically adjusted based on dynamic time warping of observed event sequence in the interaction with a desired event distribution, wherein a uniform distribution of events across the segments is created by determining discrete segment lengths that contain uniform distributions of events given a length of the content item and a frequency of events generated for the content item; and
an event summarizer operable to perform, within one or more of the segments, an action to drop an event according to a domain rule, which event the domain rule allows it to be recreated and inserted back into an event sequence;

the processor operable to transmit the compacted event logs to the server device responsive to determining that a network connection between the processor and the server device is available.

8. The system of claim 7, wherein the sensing and estimation engine determines storage constraints by determining a probability that the machine will run out of storage space in a defined time period and determining that the probability exceeds a first threshold.

9. The system of claim 8, wherein the event logs are compacted by a delta amount that keeps the probability within the first threshold.

10. The system of claim 7, further comprising:
a server processor operable to receive the compacted event logs, the server processor operable to identify historical sessions having a similar context as the compacted event logs, the similar context determined based on the historical sessions meeting to a similarity threshold,
the server processor further operable to retrieve complete event logs from the historical sessions having a similar context,
the server processor further operable to reconstruct the compacted event logs based on one or more patterns identified in the complete event logs of the historical sessions.

11. The system of claim 7, further comprising:
a content splitter operable to execute on the processor and further operable to divide a session and associated event log into segments based on time and space;
the event summarizer further operable to perform:
within one or more of the segments, an action to reduce a size of an event by removing time and space information associated with the event, except at the segment boundaries; and
within one or more segments, an action to reduce the size of a segment log by only maintaining a number of events of different types that occur within the one or more segments.

12. The system of claim 7, wherein the domain rule is governed by a transition of events.

13. A computer program product comprising a non-transitory computer readable storage medium having program instructions embodied therewith, the program instructions executable by a device to cause the device to:
monitor events generated through interactions between a user and a processor, the interactions performed via a user interface associated with an application running on the processor, the events stored by sessions in the storage device local to the processor as event logs;
estimate an amount of storage needed to store the events;
determine remaining storage on the storage device and a network connection pattern of the processor with a server device;
determine storage constraints of the storage device based on the amount of storage needed to store the events, the remaining storage on the storage device, and the network connection pattern;
initiate compacting of the event logs by progressively summarizing the events on dynamically adjusted segments of the sessions, wherein the segments are determined based on segmenting content item of the interaction into intervals and dynamically adjusted based on dynamic time warping of observed event sequence in the interaction with a desired event distribution, wherein a uniform distribution of events across the segments is created by determining discrete segment lengths that contain uniform distributions of events given a length of the content item and a frequency of events generated for the content item;
perform, within one or more of the segments, an action to drop an event according to a domain rule, which event the domain rule allows it to be recreated and inserted back into an event sequence; and
transmit the compacted event logs to the server device responsive to determining that a network connection between the processor and the server device is available.

14. The computer program product of claim 13, wherein the determining storage constraints comprises determining a probability that the machine will run of out of storage space in a defined time period and determining that the probability exceeds a first threshold.

15. The computer program product of claim 14, wherein the compacting further comprises compacting by a delta amount that keeps the probability within the first threshold.

16. The computer program product of claim 13, wherein the compacting the event logs comprises at least one of:
dividing a session and associated event log into segments based on time and space;
within one or more of the segments, performing an action to reduce a size of an event by removing time and space information associated with the event, except at the segment boundaries; and
within one or more segments, performing an action to reduce the size of a segment log by only maintaining a number of events of different types that occur within the one or more segments.

17. The computer program product of claim 13, wherein the discrete events represent actions performed on the machine during the interaction.

18. The computer program product of claim 13, wherein the application comprises educational application.

19. The computer program product of claim 13, wherein the method is performed in a resource-constrained environment.

20. The computer program product of claim 13, wherein the domain rule is governed by a transition of events.

* * * * *